(12) United States Patent
Qi et al.

(10) Patent No.: US 11,420,156 B2
(45) Date of Patent: Aug. 23, 2022

(54) ELECTROCHEMICAL DEHUMIDIFICATION DEVICE BASED ON SCREEN-TYPE AMPHOTERIC ION EXCHANGE MEMBRANE ELECTRODE

(71) Applicant: SOUTH CHINA UNIVERSITY OF TECHNOLOGY, Guangdong (CN)

(72) Inventors: Ronghui Qi, Guangdong (CN); Lizhi Zhang, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 555 days.

(21) Appl. No.: 16/492,151

(22) PCT Filed: Dec. 29, 2017

(86) PCT No.: PCT/CN2017/120368
§ 371 (c)(1),
(2) Date: Sep. 8, 2019

(87) PCT Pub. No.: WO2018/161711
PCT Pub. Date: Sep. 13, 2018

(65) Prior Publication Data
US 2021/0138396 A1  May 13, 2021

(30) Foreign Application Priority Data
Mar. 9, 2017  (CN) .......................... 201710137074.3

(51) Int. Cl.
*F24F 3/14* (2006.01)
*C25B 9/23* (2021.01)
(Continued)

(52) U.S. Cl.
CPC ............. *B01D 53/26* (2013.01); *B01D 53/30* (2013.01); *B01D 53/326* (2013.01); *C25B 9/23* (2021.01);
(Continued)

(58) Field of Classification Search
CPC . F24F 3/14; C25B 9/23; C25B 15/023; C25B 15/027; C25B 15/029; B01D 53/30; B01D 53/326
See application file for complete search history.

(56) References Cited

U.S. PATENT DOCUMENTS

2019/0264341 A1* 8/2019 Bahar ..................... C25B 13/08

FOREIGN PATENT DOCUMENTS

| CN | 1165050 | 11/1997 |
|----|---------|---------|
| CN | 103845993 | 6/2014 |

(Continued)

OTHER PUBLICATIONS

"International Search Report (Form PCT/ISA/210) of PCT/CN2017/120368," dated Mar. 30, 2018, with English translation thereof, pp. 1-6.

*Primary Examiner* — Henry T Crenshaw
*Assistant Examiner* — Daniel C Comings
(74) *Attorney, Agent, or Firm* — JCIPRNET

(57) ABSTRACT

Disclosed is an electrochemical dehumidification device based on a screen-type amphoteric ion exchange membrane electrode, comprising a core dehumidification unit which comprises, sequentially from one side to the other side, an anode air pathway, a screen-type anode electrode, an amphoteric ion exchange membrane, a screen-type cathode electrode and a cathode air pathway. The core dehumidification unit performs active dehumidification when a voltage is applied, and performs passive dehumidification when no voltage is applied. A number of the core dehumidification unit is equal to or more than one, the core dehumidification units are capable of being connected in parallel, in serial or in an overlapping mode; meanwhile, the units may also be (Continued)

used in combination with other dehumidification devices. The device achieves active/passive dehumidification, and is ultra-compact and flexible.

10 Claims, 11 Drawing Sheets

(51) Int. Cl.
| | | |
|---|---|---|
| *B01D 53/32* | (2006.01) | |
| *B01D 53/26* | (2006.01) | |
| *F24F 11/62* | (2018.01) | |
| *F24F 11/30* | (2018.01) | |
| *B01D 53/30* | (2006.01) | |
| *F24F 110/20* | (2018.01) | |

(52) U.S. Cl.
CPC ............... *F24F 3/14* (2013.01); *F24F 11/30* (2018.01); *F24F 11/62* (2018.01); *F24F 2110/20* (2018.01)

(56) References Cited

FOREIGN PATENT DOCUMENTS

| | | | | |
|---|---|---|---|---|
| CN | 105612647 | 5/2016 | | |
| CN | 106949571 | 7/2017 | | |
| CN | 206563376 | 10/2017 | | |
| JP | H0952018 | 2/1997 | | |
| JP | H1025584 | 1/1998 | | |
| JP | H1071319 | 3/1998 | | |
| JP | H1071319 A | * 3/1998 | ............. | B01D 53/26 |
| JP | H11189890 | 7/1999 | | |

\* cited by examiner

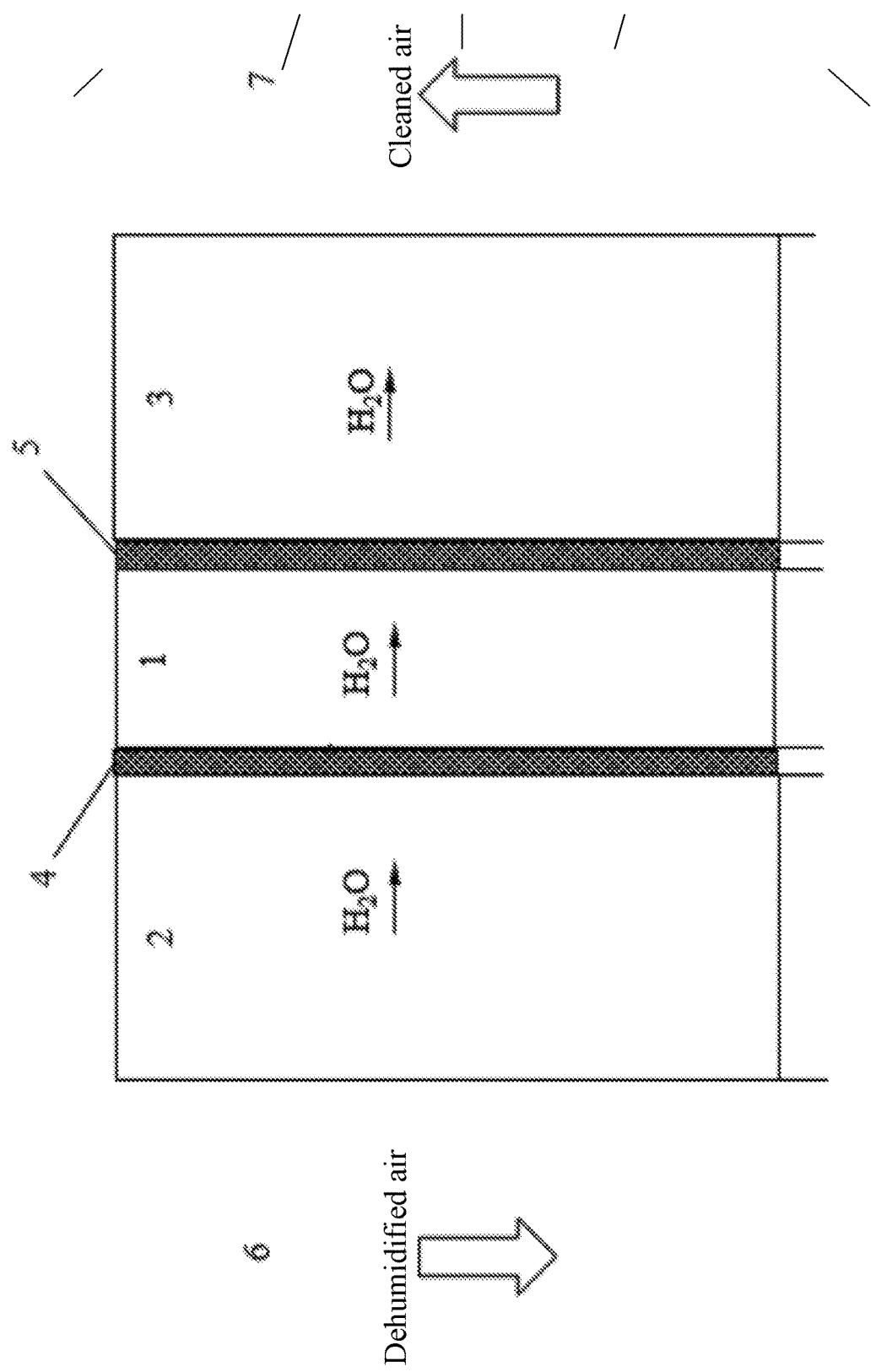

ELECTROCHEMICAL DEHUMIDIFICATION DEVICE BASED ON SCREEN-TYPE AMPHOTERIC ION EXCHANGE MEMBRANE ELECTRODE

CROSS-REFERENCE TO RELATED APPLICATION

This application is a 371 of international application of PCT application serial no. PCT/CN2017/120368, filed on Dec. 29, 2017, which claims the priority benefit of China application no. 201710137074.3, filed on Mar. 9, 2017. The entirety of each of the above mentioned patent applications is hereby incorporated by reference herein and made a part of this specification.

TECHNICAL FIELD

The present invention relates to an active/passive dehumidification device, and more particularly, to an electrochemical dehumidification device based on a screen-type amphoteric ion exchange membrane electrode.

BACKGROUND

In modern society, people spend more than 70% of their time in buildings, and an indoor air dehumidification method not only seriously affects indoor air quality and personnel health, but also greatly affects building energy consumption. In recent years, the dehumidification energy consumption of air conditioners is close to 10% to 20% of the total energy consumption of our society, and is continuously increased with an urbanization process. However, the conventional dehumidification methods widely used at present, such as a cooling method, a liquid-desiccant dehumidification method and a rotary-wheel method, all have many problems. According to the cooling method, a surface air cooler is used to cool to a dew point to condense water vapor, which has limited dehumidification capacity and high energy waste; although the desiccant dehumidification method has strong dehumidification capability, the regeneration process is complicated, many equipment and devices are required, and there may be serious consequences such as corrosion of an air duct and furniture, and harm to human health caused by secondary air pollution by the solution; and however, although the rotary-wheel dehumidification can be used at a lower temperature and can reach a lower humidity, the practical application thereof is limited by a large occupied area and easy attenuation of performance. The problem of indoor dehumidification deserves special attention in areas with high humidity in China, such as Hong Kong, Macao, Guangdong, Guangxi, Hubei, Hunan and Jiangxi.

For electrolyte membrane dehumidification serving as a novel independent humidity control technology, direct current voltage is applied to two sides of an electrolyte membrane, so that an electrolytic reaction occurs to water vapor on an anode side, and a humidity of the anode side is reduced. Single electric energy is used in the dehumidification technology without requiring a regeneration device, and the dehumidification technology has a wider operable temperature and a low dew point dehumidification performance, has no secondary pollution such as corrosion and harmful substances, and is very suitable for organic combination with renewable energy sources such as photovoltaic or wind power generation. Patent 97101826.X discloses an electrolyte membrane dehumidification device for a precision instrument, but the disadvantage thereof is that only active dehumidification can be performed, and a plane electrode is used to limit a system performance, and the implementation is relatively simple.

Therefore, the development of a more efficient electrolyte membrane dehumidification device is of great significance to solve the defects of the existing electrolyte membrane dehumidification device and promote the industrialization process thereof.

SUMMARY

The present invention is intended to provide an electrochemical dehumidification device based on a screen-type amphoteric ion exchange membrane electrode. The device is an active/passive electrochemical dehumidification device, which can perform active/passive humidity control by conducting protons or water molecules, has the advantages of simple structure, variable shape, capability of dehumidification at a low dew point, suitability for miniaturization, no secondary pollution, energy saving and muting, and meets the requirements of various environmental changes.

An electrochemical dehumidification device based on a screen-type amphoteric ion exchange membrane electrode comprises a core dehumidification unit which comprises, sequentially from one side to the other side, an anode air pathway, a screen-type anode electrode, an amphoteric ion exchange membrane, a screen-type cathode electrode and a cathode air pathway.

In a direction from the anode air pathway to the amphoteric ion exchange membrane, the screen-type anode electrode sequentially comprises an anode metal screen structure diffusion layer and an anode catalyst layer.

In a direction from the cathode air pathway to the amphoteric ion exchange membrane, the screen-type cathode electrode sequentially comprises a cathode metal screen structure diffusion layer and a cathode catalyst layer.

The anode air pathway and the cathode air pathway are both provided with an air inlet and an air outlet; and variable frequency fans are arranged outside the air inlets of the anode air pathway and the cathode air pathway.

A first air valve and a first flow sensor are arranged in the anode air pathway, and the air inlet and the air outlet of the anode air pathway are respectively provided with a first temperature and humidity sensor and a second temperature and humidity sensor.

A second air valve and a second flow sensor are arranged in the cathode air pathway, and the air inlet and the air outlet of the cathode air pathway are respectively provided with a third temperature and humidity sensor and a fourth temperature and humidity sensor.

The screen-type anode electrode and the screen-type cathode electrode are externally connected with an anode and a cathode of an adjustable direct current power supply respectively, and the adjustable direct current power supply is connected with a digital multimeter.

All of the temperature and humidity sensors, all of the flow sensors and the digital multimeter are connected with a computer.

Further, the amphoteric ion exchange membrane is a high-performance electrolyte membrane with a capability of selectively exchanging cations and anions at the same time, including a bipolar membrane or an amphoteric membrane.

Further, the amphoteric ion exchange membrane is prepared by a blending method, a copolymerization method or a radiation grafting method.

Further, the anode metal screen structure diffusion layer and the cathode metal screen structure diffusion layer are both composed of porous metal screens with a thickness of 0.8 mm to 2 mm, and are made of titanium, titanium alloy or stainless steel.

Further, the porous metal screen is provided with a corrosion-resistant conductive coating and has a rigidity required for supporting the amphoteric ion exchange membrane; the porous metal screen facilitates water vapor in the air on an anode side to approach the amphoteric ion exchange membrane and generate the electrolytic reaction, and facilitates rapid removal of the water generated by the reduction reaction on a cathode side at the same time, so that the device is simple and compact in structure, variable in shape and suitable for different spaces.

Further, by using a screen printing method, a transfer printing method or an injection method, the anode catalyst layer and the cathode catalyst layer are prepared by tightly attaching catalyst particles to a surface of the anode metal screen structure diffusion layer near the anode air pathway side and a surface of the cathode metal screen structure diffusion layer near the cathode air pathway side respectively.

Further, the catalyst particles comprise carbon-supported catalyst particles or heavy metal catalyst particles.

Further, the anode catalyst layer and the cathode catalyst layer both have contact points in close contact on an interface connected with the amphoteric ion exchange membrane; when a voltage is applied, air in the anode air pathway approaches an active site of the catalyst through the anode metal screen structure diffusion layer, and an electrolytic reaction of water vapor in the air occurs on a side of the amphoteric ion exchange membrane near the anode thereof; and air in the cathode air pathway approaches the active site of the catalyst through the cathode metal screen structure diffusion layer, and a reduction reaction of generating water by reaction of oxygen and protons occurs on a side of the amphoteric ion exchange membrane near the cathode thereof.

Further, when a voltage is applied to the core dehumidification unit, an electrolytic reaction occurs to water vapor in the air circulating in the anode air pathway on an anode side of the amphoteric ion exchange membrane to perform active dehumidification, and a reaction of formula (1) occurs on the anode side:

$$2H_2O \rightarrow 4H^+ + O_2 + 4e^-, \quad (1);$$

hydrogen ions ($H^+$) generated by the formula (1) reach a cathode side through the amphoteric ion exchange membrane, electrons ($e^-$) reach the cathode side through a circuit of the direct current power supply, and a reaction of formula (2) occurs to consume oxygen and generate water:

$$O_2 + 4H^+ + 4e^- \rightarrow 2H_2O, \quad (2);$$

water molecules generated by the formula (2) are carried away by the air circulating in the cathode air pathway. Through the reactions of the formulas (1) and (2), the humidity of the air in the anode air pathway is reduced to perform active dehumidification.

Further, when no voltage is applied to the core dehumidification unit, the water vapor in the air circulating in the anode air pathway, which is on a high humidity side, permeates through the amphoteric ion exchange membrane to enter a low humidity side by a vapor partial pressure difference caused by an air humidity difference and is carried away by the air circulating in the cathode air pathway, so that the humidity of the air in the anode air pathway is reduced to perform passive dehumidification.

Active or passive operation can be performed respectively by the core dehumidification unit with or without voltage application, so that the device can adapt to different environmental requirements and the energy consumption is reduced.

Further, the anode air pathway and the cathode air pathway are both made of insulating and air-tight materials.

Further, a flow mode of air flowing in the anode air pathway and the cathode air pathway comprises a forward flow, a reverse flow or a cross flow.

Further, in an active dehumidification process of the core dehumidification unit, air to be dehumidified flows through the anode air pathway, and ambient air flows through the cathode air pathway; the temperature and humidity sensor converts temperature and humidity of the air in the anode air pathway and the cathode air pathway into electrical signals and collect the electrical signals into a computer, the computer compares the obtained data with a set value, generates control signals through a control algorithm and sends the control signals to a control output circuit, the control output circuit respectively sends the control signals to an executing mechanism comprising the adjustable direct current power supply and the variable frequency fan, and the executing mechanism completes corresponding adjustment and control actions according to a control command.

Further, the adjustable direct current power supply can swap an anode and a cathode according to the command of the control output circuit, and a voltage can also be adjusted in real time.

Further, a voltage of the adjustable direct current power supply is adjustable in a range of 1.29V to 10V.

Further, a number of the core dehumidification unit is equal to or more than one, the core dehumidification units are capable of being connected in a series mode, a parallel mode, an overlapping mode, a combination mode or a multistage mode, and the amphoteric ion exchange membrane in each core dehumidification unit is connected with the adjustable direct current power supply in parallel or series.

The combination of various modes is favorable for the device to adapt to various space and dehumidification requirements.

Further, the core dehumidification units are used in combination with a set comprising a liquid desiccant dehumidification device, a rotary dehumidification device or a cooling dehumidification device in a single or multiple mode, and a combination mode comprises a series connection or a parallel connection; in combination with the liquid desiccant dehumidification device, a packing method for liquid desiccant dehumidification comprises plane packing, regular packing or random packing.

Various combinations with other dehumidification devices are favorable for the device to adapt to various space and dehumidification requirements.

Compared with the prior art, the present invention has the following advantages and technical effects.

(1) The device of the present invention can simply and rapidly perform humidity control, and realize active/passive dehumidification by controlling whether a voltage is applied or not; the dehumidification effect can be controlled by adjusting a magnitude of the voltage; and the positive and negative voltages can also be adjusted to realize air humidification to adapt to different environmental requirements.

(2) The active dehumidification process of the device of the present invention has the wider operable temperature and a superior operational performance in the low dew point dehumidification, and the device can be normally operated at a low temperature (0° C. or below) and a low humidity (<5%).

(3) The energy required for active dehumidification of the device of the present invention is the single electric energy with low voltage, and renewable energy comprising electric energy generated by solar energy or wind energy can be used, thus saving energy and protecting environment; and energy consumption is not required in the passive dehumidification process.

(4) The electrode material used in the core dehumidification unit of the device of the present invention is a porous metal screen structure, has the rigidity required for supporting the amphoteric ion exchange membrane, facilitates the air to approach the anode of the ion exchange membrane and generate an electrolytic reaction, and facilitates rapid removal of the water generated by the reaction of the cathode; and the device is simple and compact in structure, variable in shape, and suitable for different spaces.

(5) The device of the present invention can realize various combinations by the plurality of core dehumidification units, the flow modes of the air flowing in the air pathway are various, and the device can also be combined with other dehumidification devices, so that the device of the present invention can adapt to various space and dehumidification requirements.

(6) The device of the present invention has high safety and does not need additional medium such as cold water, solution and the like; no corrosion and harmful substances are generated, and no secondary pollution exists, so that the working environment is sanitary and clean; and no additional driving device exists, and no noise is generated during operation.

BRIEF DESCRIPTION OF THE DRAWINGS

FIG. 2b is a working principle schematic diagram of the electrochemical dehumidification device based on a screen-type amphoteric ion exchange membrane electrode according to the embodiment when no voltage is applied.

DETAILED DESCRIPTION

The technical solutions of the invention will be clearly and completely described hereinafter with reference to the embodiments and the accompanying drawings, but the invention is not limited thereto.

Figure 1:
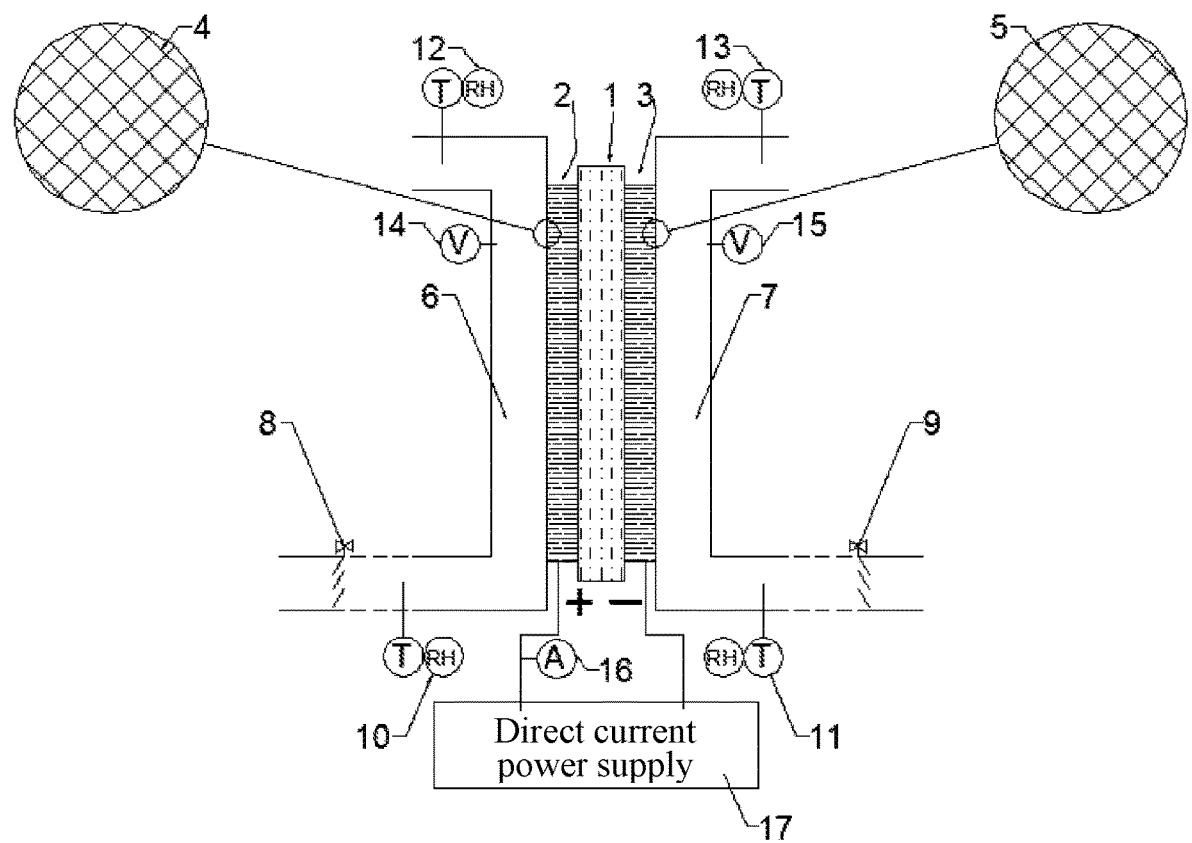
FIG. 1 is a schematic diagram of a core dehumidification unit of an electrochemical dehumidification device based on a screen-type amphoteric ion exchange membrane electrode according to the embodiment.

FIG. 1 shows a core dehumidification unit of an electrochemical dehumidification device based on a screen-type amphoteric ion exchange membrane electrode according to the embodiment, which comprises a core dehumidification unit. The core dehumidification unit comprises, sequentially from one side to the other side, an anode air pathway 6, a screen-type anode electrode, an amphoteric ion exchange membrane 1, a screen-type cathode electrode and a cathode air pathway 7.

The amphoteric ion exchange membrane 1 is a high-performance electrolyte membrane with a capability of selectively exchanging cations and water molecules at the same time, including a bipolar membrane or an amphoteric membrane. The amphoteric ion exchange membrane 1 is prepared by a blending method, a copolymerization method or a radiation grafting method. In the radiation grafting method, polyvinylidene fluoride (PVDF) is used as a base membrane for preparation. In the copolymerization method, a sulfonate is introduced on difluorobenzophenone and a quaternary ammonium group is introduced on bisphenol fluorene, and then the two monomers are copolymerized to prepare the amphoteric ion exchange membrane.

In a direction from the anode air pathway 6 to the amphoteric ion exchange membrane 1, the screen-type anode electrode sequentially comprises an anode metal screen structure diffusion layer 2 and an anode catalyst layer 4. In a direction from the cathode air pathway 7 to the amphoteric ion exchange membrane 1, the screen-type cathode electrode sequentially comprises a cathode metal screen structure diffusion layer 3 and a cathode catalyst layer 5.

The anode metal screen structure diffusion layer 2 and the cathode metal screen structure diffusion layer 3 are both composed of porous metal screens with a thickness of 0.8 mm to 2 mm, and are made of titanium, titanium alloy or stainless steel. The porous metal screen is provided with a corrosion-resistant conductive coating and has a rigidity required for supporting the amphoteric ion exchange membrane 1. The porous metal screen facilitates water vapor in the air on an anode side to approach the amphoteric ion exchange membrane 1 and generate the electrolytic reaction, and facilitates rapid removal of the water generated by the reduction reaction on a cathode side at the same time.

By using a screen printing method, a transfer printing method or an injection method, the anode catalyst layer 4 and the cathode catalyst layer 5 are prepared by tightly attaching catalyst particles to a surface of the anode metal screen structure diffusion layer 2 near the anode air pathway 6 side and a surface of the cathode metal screen structure diffusion layer 3 near the cathode air pathway 7 side respectively. The anode catalyst layer 4 and the cathode catalyst layer 5 both have contact points in close contact on an interface connected with the amphoteric ion exchange membrane 1, when a voltage is applied, air in the anode air pathway 6 approaches an active site of the catalyst through the anode metal screen structure diffusion layer 2, and an electrolytic reaction of water vapor in the air occurs on a side of the amphoteric ion exchange membrane 1 near the anode thereof. Air in the cathode air pathway 7 approaches the active site of the catalyst through the cathode metal screen structure diffusion layer 3, and a reduction reaction of generating water by reaction of oxygen and protons occurs on a side of the amphoteric ion exchange membrane 1 near the cathode thereof.

The screen-type anode electrode and the screen-type cathode electrode are externally connected with an anode and a cathode of an adjustable direct current power supply 17 respectively, and the adjustable direct current power supply 17 is connected with a digital multimeter 16. The adjustable direct current power supply 17 can swap an anode and a cathode according to the command of the control output circuit, and a voltage can also be adjusted in real time. A voltage of the adjustable direct current power supply 17 is adjustable in a range of 1.29 V to 10 V.

The anode air pathway 6 and the cathode air pathway 7 are both provided with an air inlet and an air outlet. A first air valve 8 and a first flow sensor 14 are arranged in the anode air pathway 6, and the air inlet and the air outlet of the anode air pathway 6 are respectively provided with a first temperature and humidity sensor 12 and a second temperature and humidity sensor 10. A second air valve 9 and a second flow sensor 15 are arranged in the cathode air pathway 7, and the air inlet and the air outlet of the cathode air pathway 7 are respectively provided with a third temperature and humidity sensor 11 and a fourth temperature and humidity sensor 13.

Variable frequency fans are arranged outside the air inlets of the anode air pathway 6 and the cathode air pathway 7. The anode air pathway 6 and the cathode air pathway 7 are both made of insulating and air-tight materials. A flow mode of air flowing in the anode air pathway 6 and the cathode air pathway 7 comprises a forward flow, a reverse flow or a cross flow.

All of the temperature and humidity sensors (10, 11, 12 and 13), all of the flow sensors (14 and 15) and the digital multimeter 16 are connected with a computer.

When a voltage is applied to the core dehumidification unit, an electrolytic reaction occurs to water vapor in the air circulating in the anode air pathway 6 on an anode side of the amphoteric ion exchange membrane 1 to perform active dehumidification. When no voltage is applied to the core dehumidification unit, the water vapor in the air circulating in the anode air pathway 6, which is on a high humidity side, permeates through the amphoteric ion exchange membrane 1 to enter a low humidity side to perform passive dehumidification by a vapor partial pressure difference caused by an air humidity difference.

In an active dehumidification process, air to be dehumidified in the core dehumidification unit flows through the anode air pathway 6, and ambient air flows through the cathode air pathway 7. The temperature and humidity sensors (10, 11, 12 and 13) convert temperature and humidity of the air in the anode air pathway 6 and the cathode air pathway 7 into electrical signals and collect the electrical signals into a computer, the computer compares the obtained data with a set value, generates control signals through a control algorithm and sends the control signals to a control output circuit, the control output circuit respectively sends the control signals to an executing mechanism comprising the adjustable direct current power supply 1 and the variable frequency fan, and the executing mechanism completes corresponding adjustment and control actions according to a control command.

A number of the core dehumidification unit is equal to or more than one, the core dehumidification units are capable of being connected in a series mode, a parallel mode, an overlapping mode, a combination mode or a multistage mode, and the amphoteric ion exchange membrane 1 in each core dehumidification unit is connected with the adjustable direct current power supply 1 in parallel mode or series.

The dehumidification device according to the embodiment can be normally operated at a low temperature (0° C. or below) and a low humidity (<5%).

The devices can be used in combination with a set comprising a liquid desiccant dehumidification device, a rotary dehumidification device or a cooling dehumidification device in a single or multiple mode, and a combination mode comprises a series connection or a parallel connection.

Embodiment 1

Figure 2A:
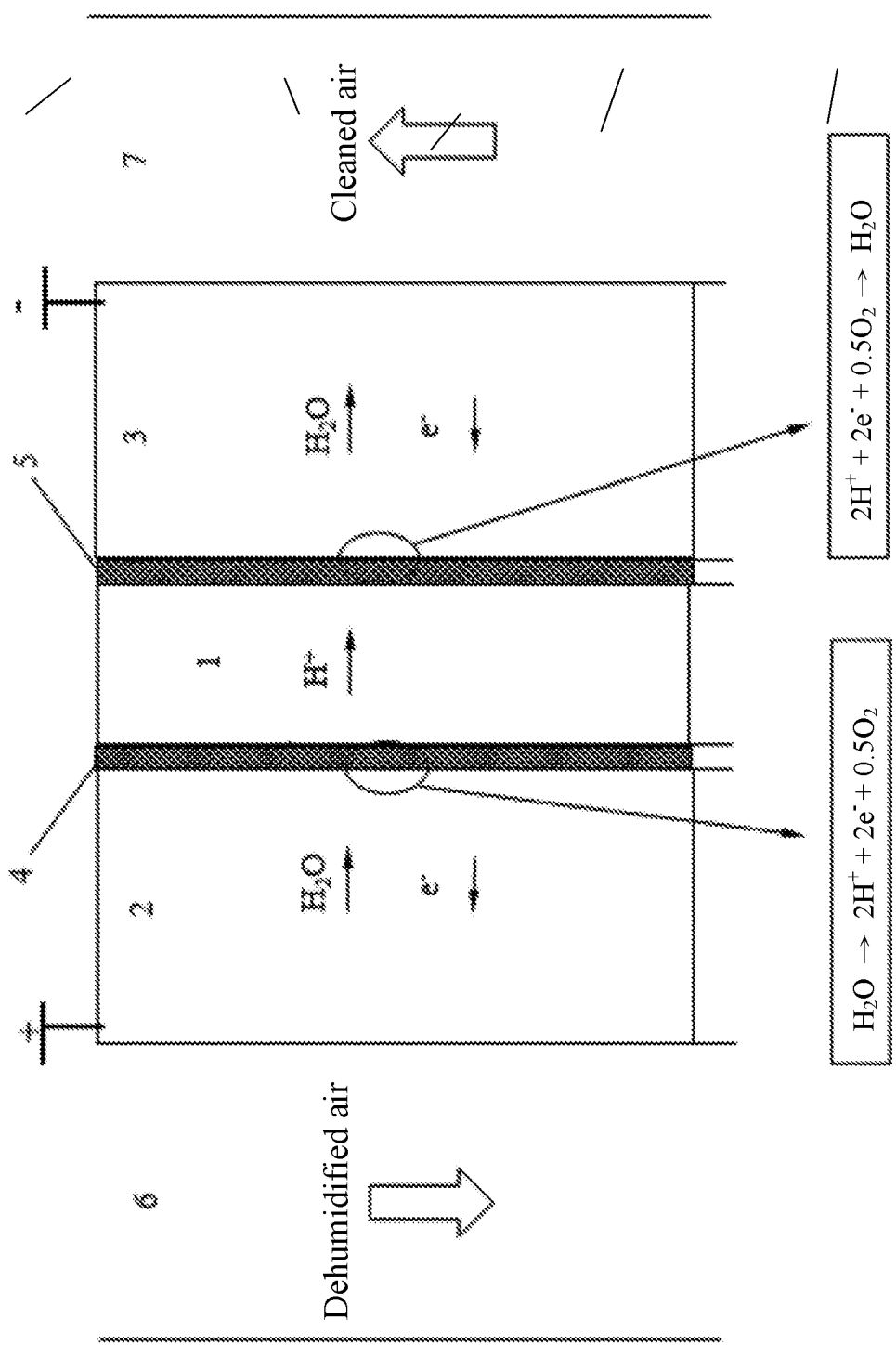
FIG. 2a is a working principle schematic diagram of the electrochemical dehumidification device based on a screen-type amphoteric ion exchange membrane electrode according to the embodiment when a voltage is applied.

FIG. 2a and FIG. 2b respectively show working principle diagrams of the device according to the embodiment when a voltage is applied and when no voltage is applied.

As shown in FIG. 2a, when a voltage is applied to a core dehumidification unit, an electrolytic reaction occurs to water vapor in air circulating in an anode air pathway 6 on an anode side of an amphoteric ion exchange membrane 1, which is shown in formula (1):

$2H_2O \rightarrow 4H^+ + O_2 + 4e^-$, (1). Through the reaction of the formula (1), a humidity of the air in the anode air pathway 6 is reduced. At the moment, hydrogen ions ($H^+$) generated by the formula (1) reach a cathode side through the amphoteric ion exchange membrane 1, electrons ($e^-$) reach the cathode side through a circuit of a direct current power supply, and a reaction of formula (2) occurs to consume oxygen and generate water: 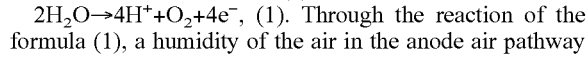, (2). The reaction of the formula (2) consumes oxygen and generates water. In this way, water vapor in the air flowing through the anode air pathway is electrolyzed, and water molecules generated by the formula (2) are carried away by the air circulating in the cathode air pathway 7. Through the reactions of the formulas (1) and (2), the humidity of the air in the anode air pathway 6 is reduced to perform active dehumidification.

As shown in FIG. 2b, when no voltage is applied, the water vapor in the air circulating in the anode air pathway 6 (a high humidity side) permeates through the amphoteric ion exchange membrane 1 to enter the cathode air pathway 7 (a low humidity side) by a vapor partial pressure difference caused by an air humidity difference and is carried away by the air circulating in the cathode air pathway 7, so that the humidity of the air in the anode air pathway 6 is reduced to perform passive dehumidification.

Embodiment 2

Figure 3:
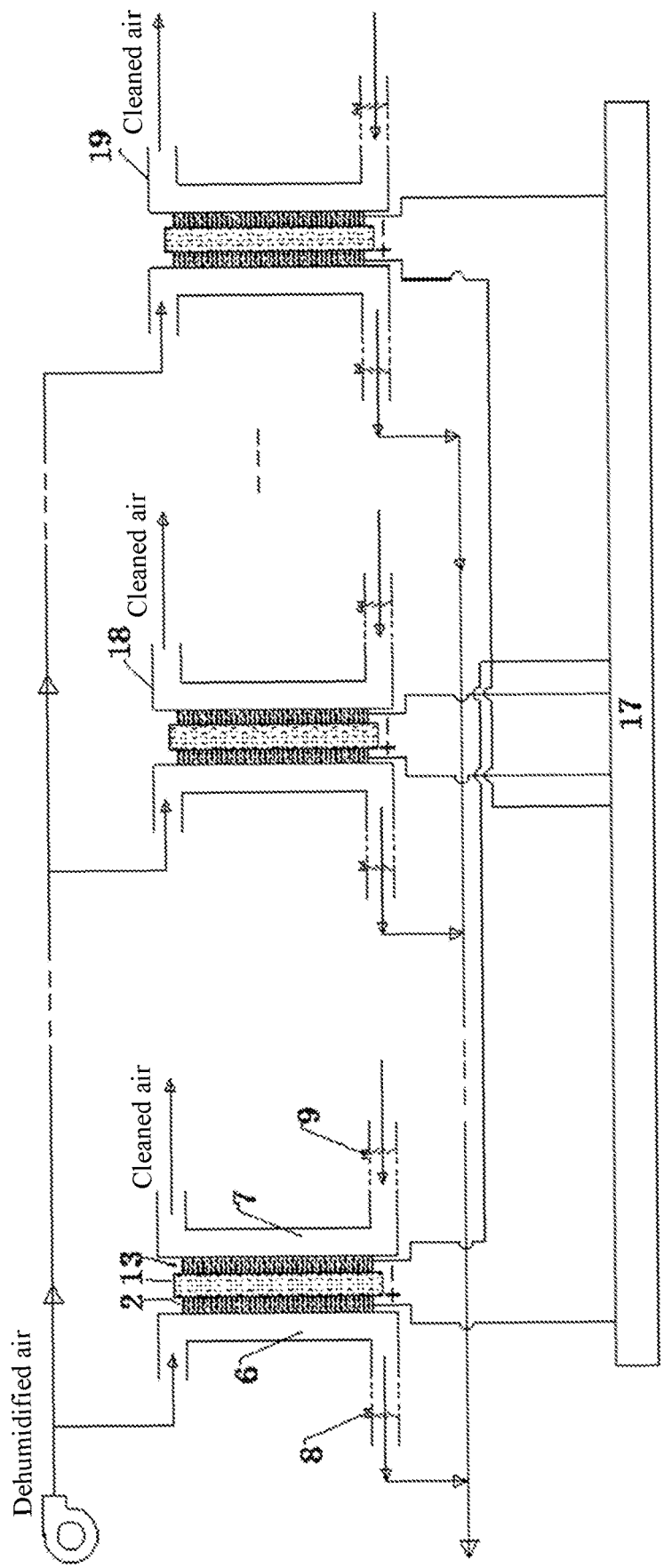
FIG. 3 is a schematic diagram of a plurality of core dehumidification units combined in parallel in the electrochemical dehumidification device based on a screen-type amphoteric ion exchange membrane electrode according to the embodiment.
Figure 4:
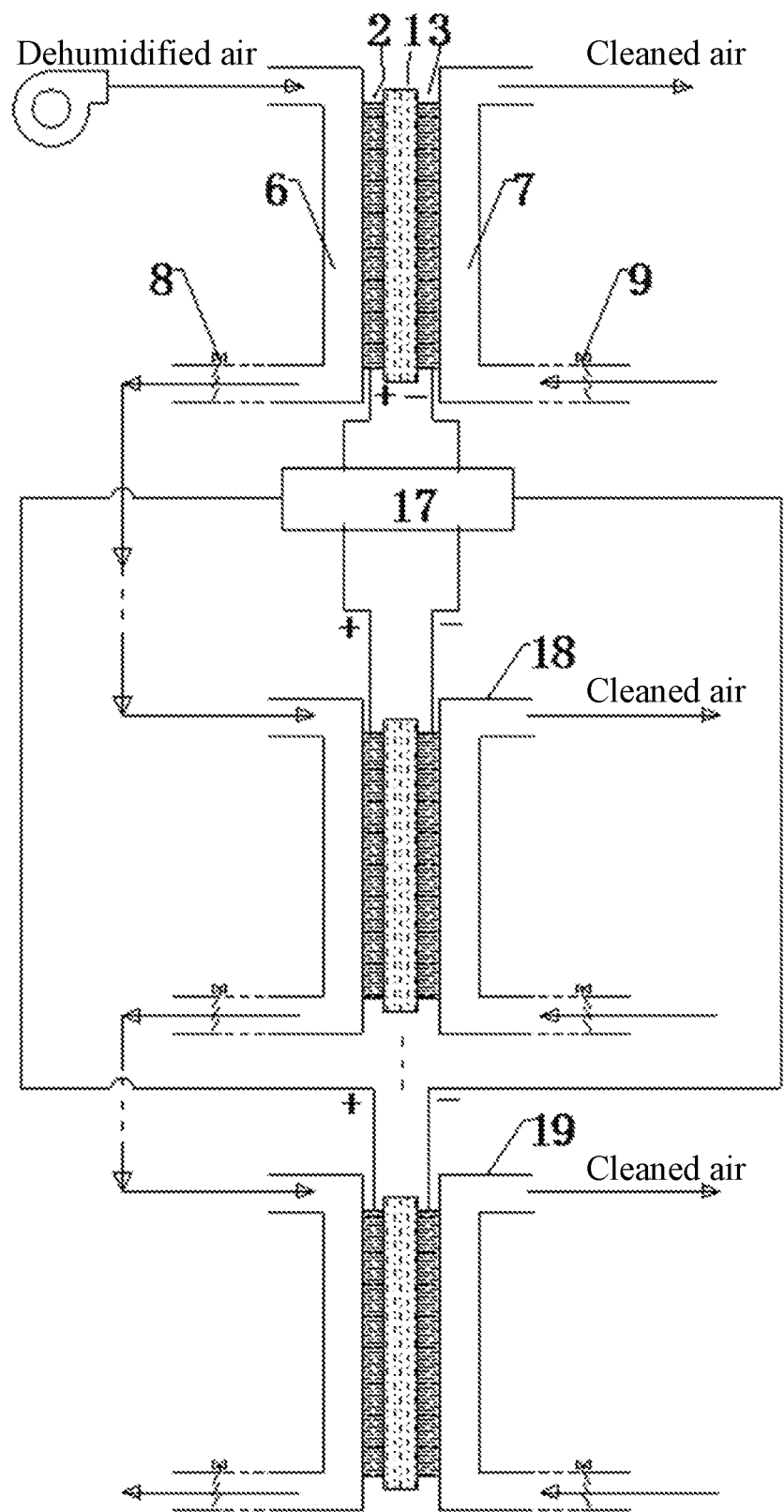
FIG. 4 is a schematic diagram of the plurality of core dehumidification units combined in series in the electrochemical dehumidification device based on a screen-type amphoteric ion exchange membrane electrode according to the embodiment.

FIG. 3 and FIG. 4 show diagrams of a plurality of core dehumidification units combined in parallel and series.

FIG. 3 is a diagram of a plurality of core dehumidification units combined in parallel. During the dehumidification process, variable frequency fans, a first air valve 8 and a second air valve 9 are firstly switched on, so that air to be dehumidified respectively flows through anode air pathways 6 of a second core dehumidification unit 18 to an $n^{th}$ core dehumidification unit 19 in parallel, and then is collected into one stream and sent into a room, while ambient air enters cathode air pathways 7. During operation, a temperature and humidity sensor senses a humidity in the air pathway and converts the humidity into electrical signals and collect the electrical signals into a computer, the computer compares the humidity signal with set temperature and humidity required, judges that active/passive dehumidification is required, generates a series of control signals (comprising a direct current power supply, a voltage and a frequency of the variable frequency fan) through a control algorithm and sends the control signals to a control output circuit.

In the case of active dehumidification, an adjustable direct current power supply 17 is switched on, voltages are applied to two sides of the core dehumidification unit, an electrolytic reaction of water occurs in the anode air pathway 6, a humidity of air in the anode air pathway 6 is reduced, and a humidity of air in the cathode air pathway 7 is increased.

In the case of passive dehumidification, the adjustable direct current power supply 17 is switched off, a humidity of air on a higher humidity side is reduced, and a humidity of air on a lower humidity side is increased by a vapor partial pressure difference of water vapor; the humidity in the air pathway is continuously collected by the temperature and humidity sensor into the computer, and is repeatedly adjusted until a set parameter is reached.

A number of the core dehumidification units, air volumes of dehumidified air and blown air, a voltage of the direct current power supply, etc. are determined by working conditions and dehumidification requirements.

FIG. 4 is a diagram of a plurality of core dehumidification units combined in series, which is different from the parallel combination mode. During the dehumidification process, the air to be dehumidified sequentially flows through the anode air pathways 6 of a plurality of core dehumidification units in series, and then is sent into the room, while the ambient air enters the cathode air pathways 7.

Embodiment 3

Figure 5:
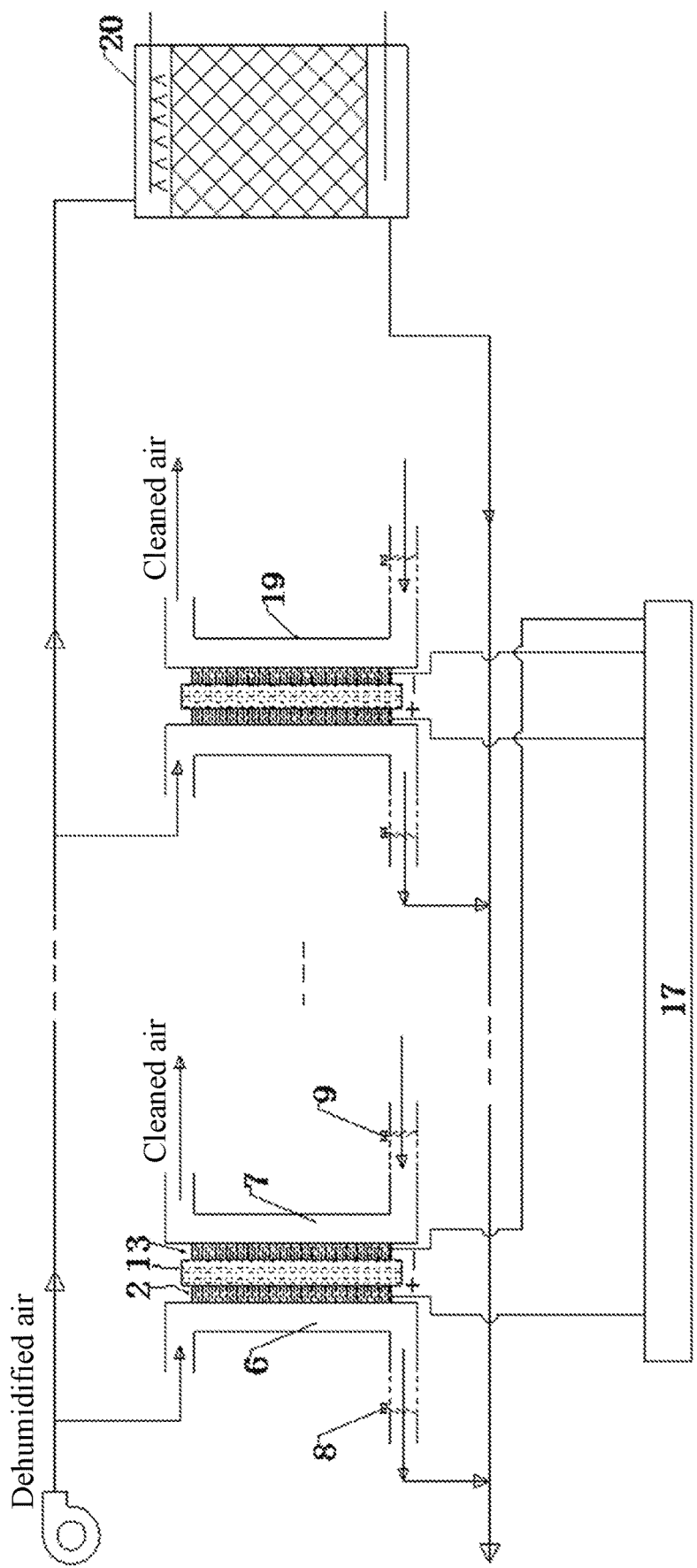
FIG. 5 is a schematic diagram illustrating dehumidification by a plurality of electrochemical dehumidification devices based on a screen-type amphoteric ion exchange membrane electrode according to the embodiment combined in parallel with a liquid desiccant dehumidification device.
Figure 6:
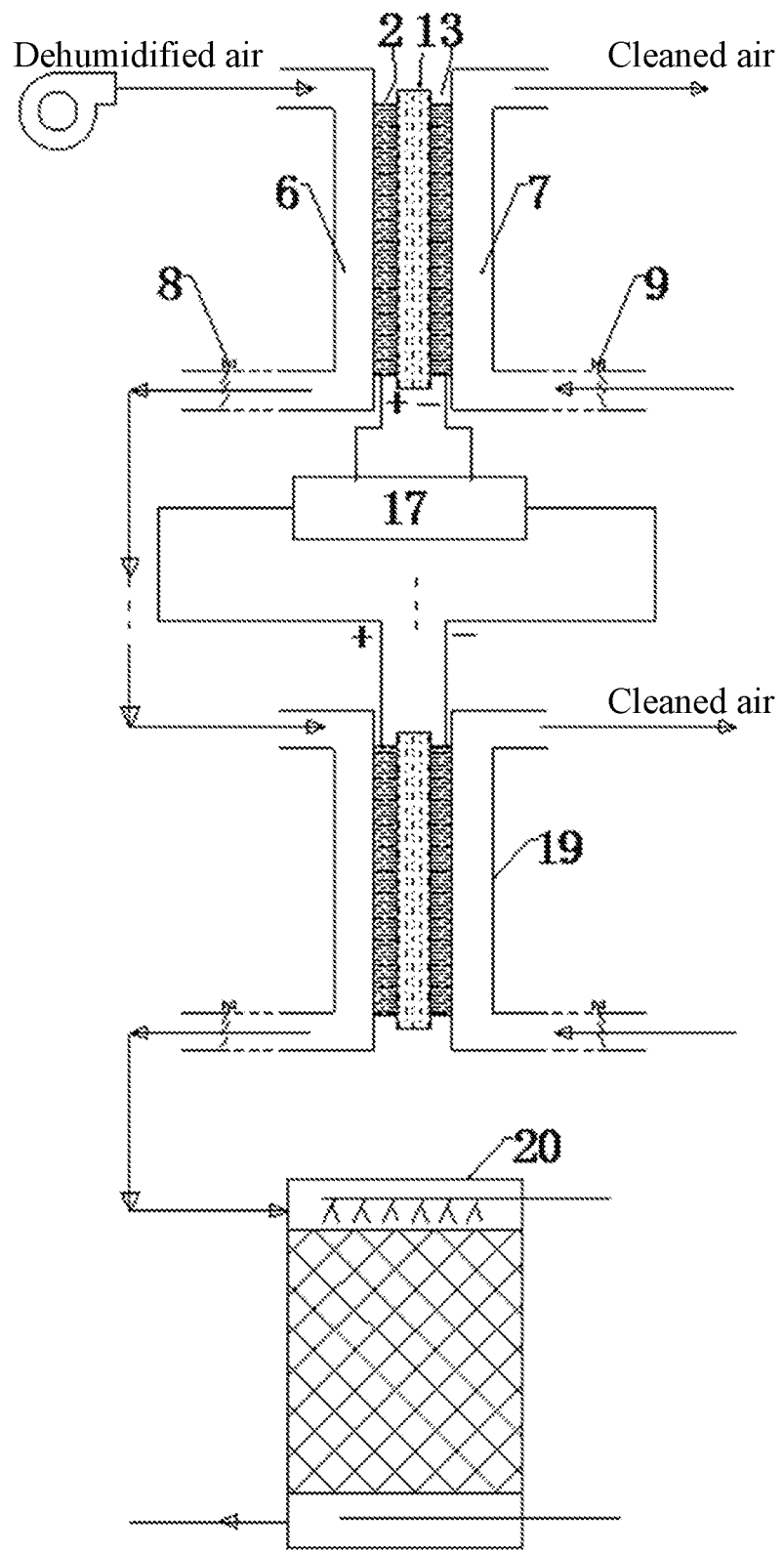
FIG. 6 is a schematic diagram illustrating dehumidification by the plurality of electrochemical dehumidification devices based on a screen-type amphoteric ion exchange membrane electrode according to the embodiment combined in series with the liquid desiccant dehumidification device.

FIG. 5 and FIG. 6 are diagrams illustrating dehumidification by a plurality of dehumidification devices combined in parallel and series with a liquid desiccant dehumidification device 20.

FIG. 5 is a diagram illustrating dehumidification by a plurality of dehumidification devices combined in parallel with a liquid desiccant dehumidification device 20. During the dehumidification process, variable frequency fans, a first air valve 8 and a second air valve 9 are firstly switched on, so that air to be dehumidified respectively flows through anode air pathways 6 of core dehumidification units of the plurality of dehumidification devices in parallel, enters the liquid desiccant dehumidification device 20 to be contacted with a solution at the same time, and then is collected into one stream and sent into a room, while ambient air enters cathode air pathways 7. A humidity in the air pathway is continuously collected by a temperature and humidity sensor into a computer, and is repeatedly adjusted until a set parameter is reached. A number of electrochemical dehumidification units, air volumes of dehumidified air and blown air, a voltage of the direct current power supply, etc. are determined by working conditions and dehumidification requirements.

FIG. 6 is a diagram illustrating dehumidification by the plurality of dehumidification devices combined in series with the liquid desiccant dehumidification device 20. Different from the parallel combination mode, the air to be dehumidified sequentially flows through the anode air pathways 6 of the core dehumidification units of the plurality of dehumidification devices in series, enters the liquid desiccant dehumidification device 20 to be contacted with the solution next, and then is sent into the room, while the ambient air enters the cathode air pathways 7.

Embodiment 4

Figure 7:
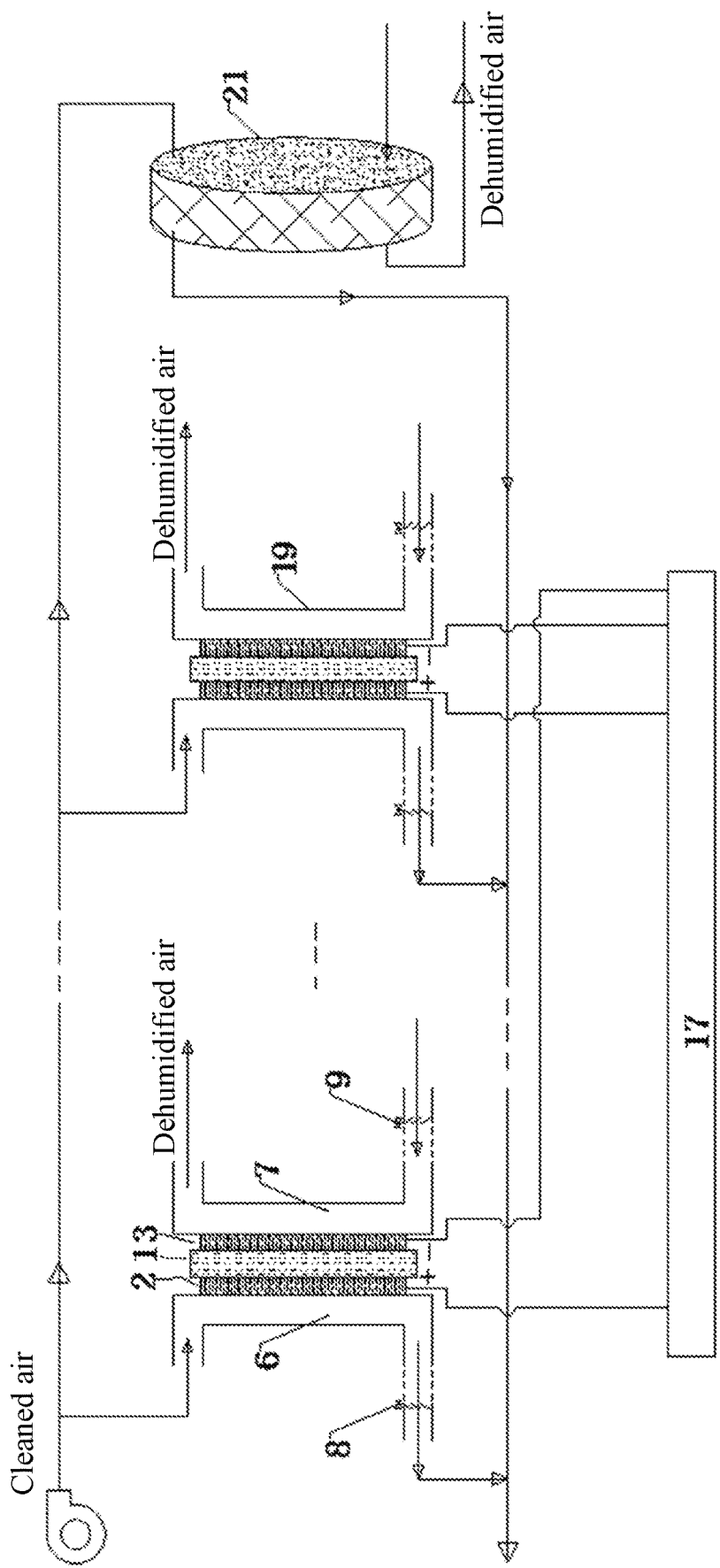
FIG. 7 is a schematic diagram illustrating dehumidification by the plurality of electrochemical dehumidification devices based on a screen-type amphoteric ion exchange membrane electrode according to the embodiment combined in parallel with a rotary dehumidification device.
Figure 8:
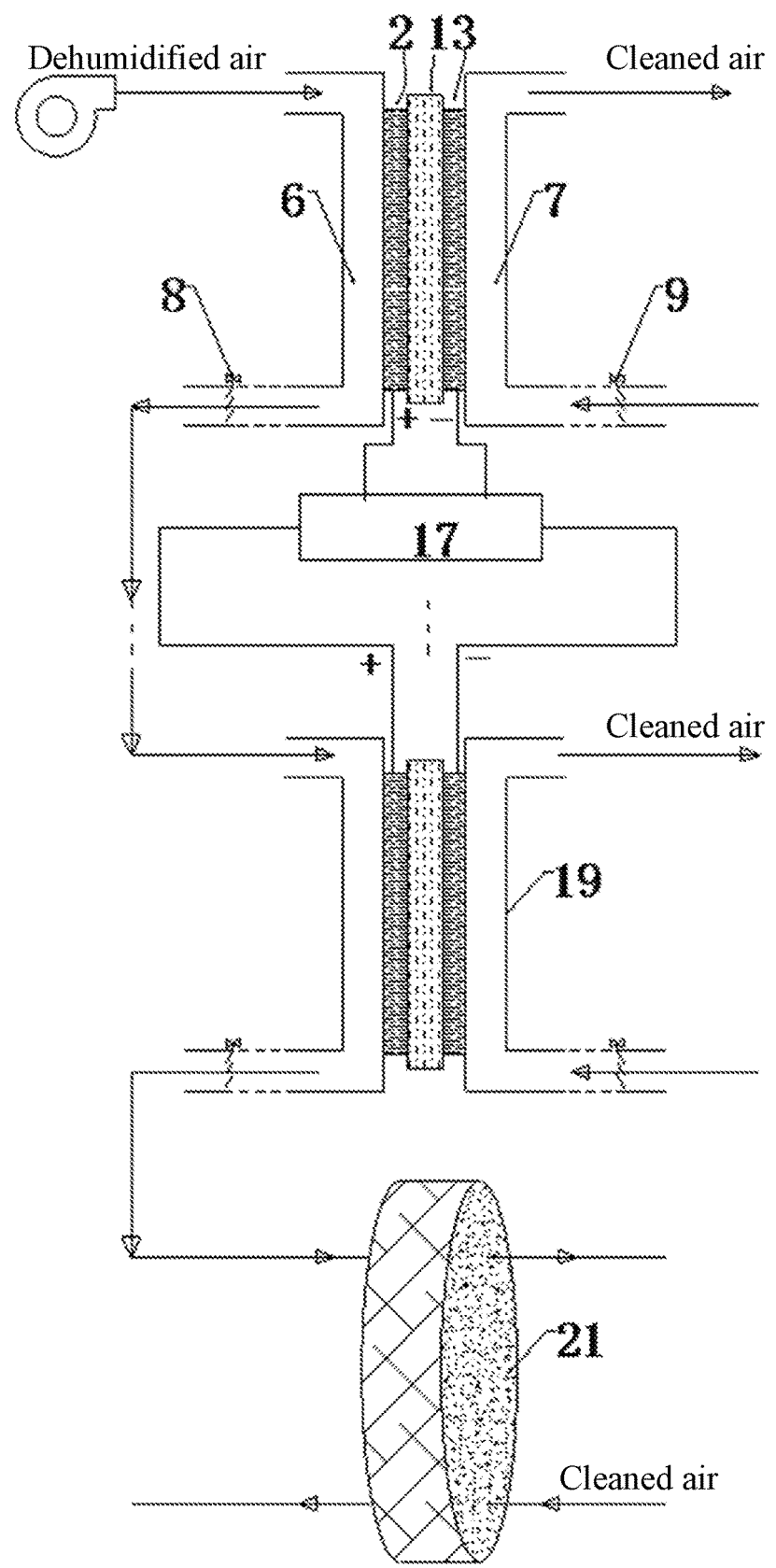
FIG. 8 is a schematic diagram illustrating dehumidification by the plurality of electrochemical dehumidification devices based on a screen-type amphoteric ion exchange membrane electrode according to the embodiment combined in series with the rotary dehumidification device.

FIG. 7 and FIG. 8 are diagrams illustrating dehumidification by a plurality of dehumidification devices combined in parallel and series with a rotary dehumidification device 21.

FIG. 7 is a diagram illustrating dehumidification by a plurality of dehumidification devices combined in parallel with a rotary dehumidification device 21. During the dehumidification process, variable frequency fans, a first air valve 8 and a second air valve 9 are firstly switched on, so that air to be dehumidified respectively flows through anode air pathways 6 of core dehumidification units of the plurality of dehumidification devices in parallel, enters a dehumidification side of the rotary dehumidification device 21, and then is collected into one stream and sent into a room, while ambient air enters cathode air pathways 7 and a regeneration side of the rotary dehumidification device 21. A humidity in the air pathway is continuously collected by a temperature and humidity sensor into a computer, and is repeatedly adjusted until a set parameter is reached. A number of electrochemical dehumidification units, air volumes of dehumidified air and blown air, a voltage of the direct current power supply, etc. are determined by working conditions and dehumidification requirements.

FIG. 8 is a diagram illustrating dehumidification by the plurality of dehumidification devices combined in series with the rotary dehumidification device 21, which is different from the parallel combination mode. During the dehumidification process, the air to be dehumidified respectively flows through the anode air pathways 6 of the core dehumidification units of the plurality of dehumidification devices in series, enters the dehumidification side of the rotary dehumidification device 21, and then is collected into one stream and sent into the room, while the ambient air enters the cathode air pathways 7 and the regeneration side of the rotary dehumidification device 21.

Embodiment 5

Figure 9:
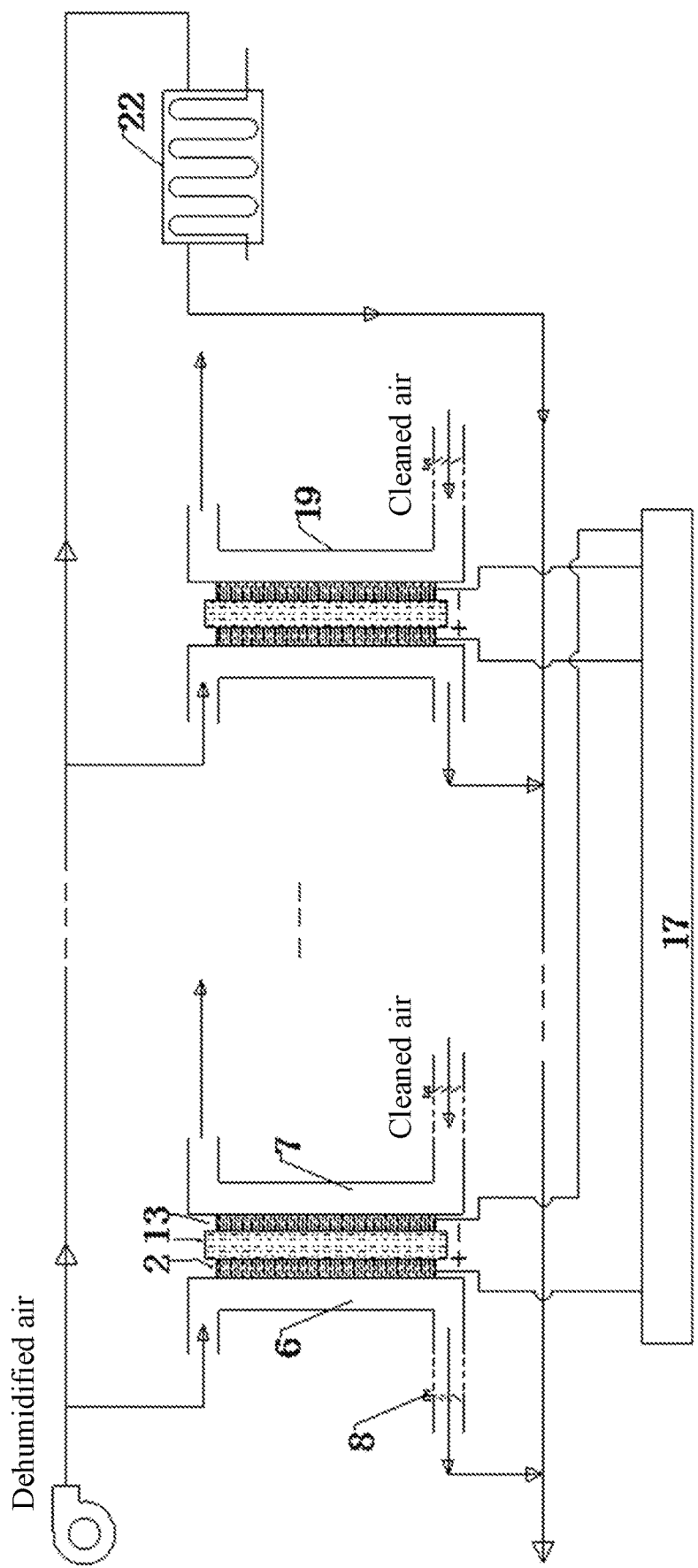
FIG. 9 is a schematic diagram illustrating dehumidification by the plurality of electrochemical dehumidification devices based on a screen-type amphoteric ion exchange membrane electrode according to the embodiment combined in parallel with a cooling dehumidification device.
Figure 10:
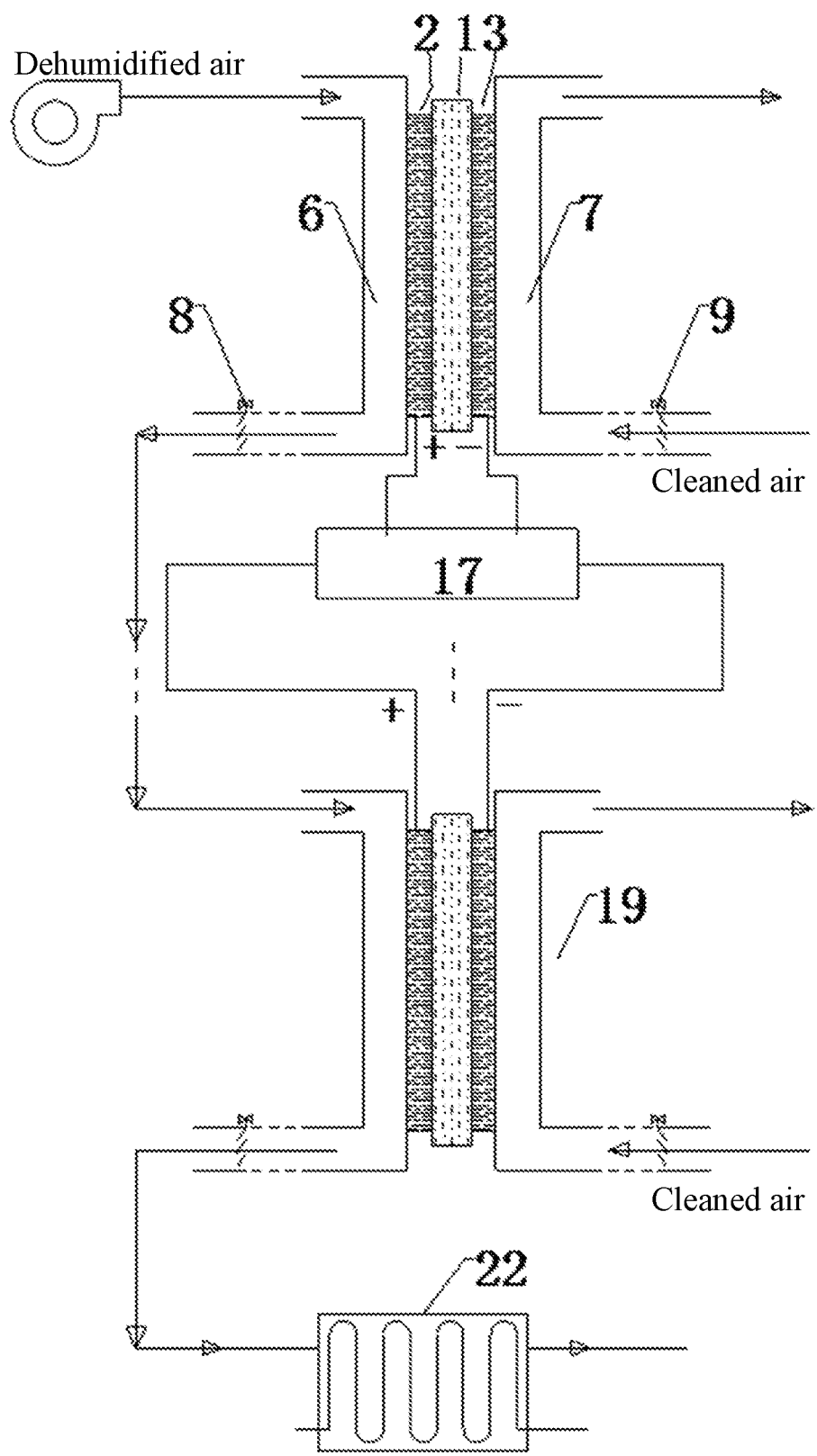
FIG. 10 is a schematic diagram illustrating dehumidification by the plurality of electrochemical dehumidification devices based on a screen-type amphoteric ion exchange membrane electrode according to the embodiment combined in series with the cooling dehumidification device.

FIG. 9 and FIG. 10 are diagrams illustrating dehumidification by a plurality of dehumidification devices combined in parallel and series with a cooling dehumidification device 22.

FIG. 9 is a diagram illustrating dehumidification by a plurality of dehumidification devices combined in parallel with a cooling dehumidification device 22. During the dehumidification process, variable frequency fans, a first air valve 8 and a second air valve 9 are firstly switched on, so that air to be dehumidified respectively flows through anode air pathways 6 of core dehumidification units of the plurality of dehumidification devices in parallel, enters the cooling dehumidification device to be contacted with a cooling coil, and then is collected into one stream and sent into a room, while ambient air enters cathode air pathways 7. A humidity in the air pathway is continuously collected by a temperature and humidity sensor into a computer, and is repeatedly adjusted until a set parameter is reached. A number of electrochemical dehumidification units, air volumes of dehumidified air and blown air, a voltage of the direct current power supply, etc. are determined by working conditions and dehumidification requirements.

FIG. 10 is a diagram illustrating dehumidification by the plurality of dehumidification devices combined in series with the cooling dehumidification device 22, which is different from the parallel combination mode. During the dehumidification process, the air to be dehumidified respectively flows through the anode air pathways 6 of the core dehumidification units of the plurality of dehumidification devices in series, enters the cooling dehumidification device to be contacted with the cooling coil, and then is collected into one stream and sent into the room, while the ambient air enters the cathode air pathways 7.

The embodiments of the invention are not limited by the embodiments above. Apparently, the embodiments described are only a part of the embodiments of the invention rather than all of the embodiments. Based on the embodiments of the invention, all other embodiments obtained without creative works, such as changes, modifications, substitutions, combinations, simplifications made without departing from the spirit and principle of the invention shall be deemed as equivalent replacement methods and included in the protection scope of the invention.

What is claimed is:

1. An electrochemical dehumidification device based on a screen-type amphoteric ion exchange membrane electrode, comprising a core dehumidification unit wherein the core dehumidification unit comprises, sequentially from one side to the other side, an anode air pathway, a screen-type anode electrode, an amphoteric ion exchange membrane, a screen-type cathode electrode and a cathode air pathway;
   in a direction from the anode air pathway to the amphoteric ion exchange membrane, the screen-type anode electrode sequentially comprises an anode metal screen structure diffusion layer and an anode catalyst layer;
   in a direction from the cathode air pathway to the amphoteric ion exchange membrane, the screen-type cathode electrode sequentially comprises a cathode metal screen structure diffusion layer and a cathode catalyst layer;
   the anode air pathway and the cathode air pathway are both provided with an air inlet and an air outlet; and variable frequency fans are arranged outside the air inlets of the anode air pathway and the cathode air pathway;
   a first air valve and a first flow sensor are arranged in the anode air pathway, and the air inlet and the air outlet of the anode air pathway are respectively provided with a first temperature and humidity sensor and a second temperature and humidity sensor;
   a second air valve and a second flow sensor are arranged in the cathode air pathway, and the air inlet and the air outlet of the cathode air pathway are respectively provided with a third temperature and humidity sensor and a fourth temperature and humidity sensor;
   the screen-type anode electrode and the screen-type cathode electrode are externally connected with an anode and a cathode of an adjustable direct current power supply respectively, and the adjustable direct current power supply is connected with a digital multimeter; and
   all of the temperature and humidity sensors, all of the flow sensors and the digital multimeter are connected with a computer.

2. The electrochemical dehumidification device based on a screen-type amphoteric ion exchange membrane electrode according to claim 1, wherein the amphoteric ion exchange membrane is a high-performance electrolyte membrane with a capability of selectively exchanging cations and water molecules at the same time, including a bipolar membrane or an amphoteric membrane; and the amphoteric ion exchange membrane is prepared by a blending method, a copolymerization method or a radiation grafting method.

3. The electrochemical dehumidification device based on a screen-type amphoteric ion exchange membrane electrode according to claim 1, wherein the anode catalyst layer and the cathode catalyst layer both have contact points in close contact on an interface connected with the amphoteric ion exchange membrane; when a voltage is applied, air in the anode air pathway approaches an active site of the catalyst through the anode metal screen structure diffusion layer, and an electrolytic reaction of water vapor in the air occurs on a side of the amphoteric ion exchange membrane near the anode thereof; and air in the cathode air pathway approaches the active site of the catalyst, through the cathode metal screen structure diffusion layer, and a reduction reaction of generating water by reaction of oxygen and protons occurs on a side of the amphoteric ion exchange membrane near the cathode thereof.

4. The electrochemical dehumidification device based on a screen-type amphoteric ion exchange membrane electrode according to claim 1, wherein the anode metal screen structure diffusion layer and the cathode metal screen structure diffusion layer are both composed of porous metal screens with a thickness of 0.8 mm to 2 mm, and are made of titanium, titanium alloy or stainless steel; the porous metal screen is provided with a corrosion-resistant conductive coating and has a rigidity required for supporting the amphoteric ion exchange membrane; the porous metal screen facilitates water vapor in the air on an anode side to approach the amphoteric ion exchange membrane and generate an electrolytic reaction, and facilitates rapid removal of the water generated by a reduction reaction on a cathode side at the same time; and by using a screen printing method, a transfer printing method or an injection method, the anode catalyst layer and the cathode catalyst layer are prepared by tightly attaching catalyst particles to a surface of the anode metal screen structure diffusion layer near the anode air pathway side and a surface of the cathode metal screen structure diffusion layer near the cathode air pathway side respectively.

5. The electrochemical dehumidification device based on a screen-type amphoteric ion exchange membrane electrode according to claim 1, wherein the anode air pathway and the cathode air pathway are both made of insulating and air-tight materials; and a flow mode of air flowing in the anode air pathway and the cathode air pathway comprises a forward flow, a reverse flow or a cross flow.

6. The electrochemical dehumidification device based on a screen-type amphoteric ion exchange membrane electrode according to claim 1, wherein when the voltage is applied to the core dehumidification unit, an electrolytic reaction occurs to water vapor in the air circulating in the anode air pathway on an anode side of the amphoteric ion exchange membrane to perform active dehumidification; and when no voltage is applied to the core dehumidification unit, the water vapor in the air circulating in the anode air pathway, which is on a high humidity side, permeates through the amphoteric ion exchange membrane to enter a low humidity side to perform passive dehumidification by a vapor partial pressure difference caused by an air humidity difference.

7. The electrochemical dehumidification device based on a screen-type amphoteric ion exchange membrane electrode according to claim 6, wherein in an active dehumidification process, air to be dehumidified flows through the anode air pathway, and ambient air flows through the cathode air pathway; the temperature and humidity sensor converts temperature and humidity of the air in the anode air pathway and the cathode air pathway into electrical signals and collect the electrical signals into a computer, the computer compares the obtained data with a set value, generates control signals through a control algorithm and sends the control signals to a control output circuit, the control output circuit respectively sends the control signals to an executing mechanism comprising the adjustable direct current power supply and the variable frequency fan, and the executing mechanism completes corresponding adjustment and control actions according to a control command.

8. The electrochemical dehumidification device based on a screen-type amphoteric ion exchange membrane electrode according to claim 7, wherein the adjustable direct current power supply can swap the anode and the cathode according to the command of the control output circuit, and a voltage can also be adjusted in real time; and a voltage of the adjustable direct current power supply is adjustable in a range of 1.29 V to 10 V.

9. The electrochemical dehumidification device based on a screen-type amphoteric ion exchange membrane electrode according to claim 1, wherein a number of the core dehumidification unit is equal to or more than one, the core dehumidification units are capable of being connected in of a series mode, a parallel mode, an overlapping mode, a combination mode or a multistage mode, and the core dehumidification units are connected with the adjustable direct current power supply in parallel or series.

10. The electrochemical dehumidification device based on a screen-type amphoteric ion exchange membrane electrode according to claim 1, wherein the one or more of core dehumidification units are used in combination with a set comprising a liquid-desiccant dehumidification device, a rotary-wheel dehumidification device or a cooling dehumidification device, and a connection mode comprises a series connection or a parallel connection.

\* \* \* \* \*